United States Patent
Willimann et al.

(10) Patent No.: US 8,497,315 B2
(45) Date of Patent: Jul. 30, 2013

(54) METHOD FOR PRODUCING DISPERSIONS AND USE THEREOF

(75) Inventors: Hongli Willimann, Baar (CH); Jakob Wolfisberg, Luzern (CH); Ulf Kehrer, Hattersheim (DE)

(73) Assignee: Akzo Nobel N.V., Arnhem (NL)

( * ) Notice: Subject to any disclaimer, the term of this patent is extended or adjusted under 35 U.S.C. 154(b) by 592 days.

(21) Appl. No.: 12/515,393

(22) PCT Filed: Nov. 15, 2007

(86) PCT No.: PCT/EP2007/062423
§ 371 (c)(1),
(2), (4) Date: Sep. 4, 2009

(87) PCT Pub. No.: WO2008/059034
PCT Pub. Date: May 22, 2008

(65) Prior Publication Data
US 2010/0081736 A1    Apr. 1, 2010

(30) Foreign Application Priority Data
Nov. 17, 2006  (EP) .................................... 06023903

(51) Int. Cl.
*C08F 2/24* (2006.01)

(52) U.S. Cl.
USPC ........... 524/458; 524/547; 526/201; 526/286; 526/287

(58) Field of Classification Search
USPC .................. 524/458, 547; 526/201, 286, 287
See application file for complete search history.

(56) References Cited

U.S. PATENT DOCUMENTS 6,316,568 B1 * 11/2001 Kohlammer et al. ......... 526/287
6,441,082 B1 *  8/2002 Weitzel et al. ................ 524/458
6,559,236 B1   5/2003 Willimann et al.

FOREIGN PATENT DOCUMENTS

| DE | 195 06 331 | 8/1996 |
|---|---|---|
| EP | 0 206 814 | 12/1986 |
| EP | 0 725 092 | 8/1996 |
| WO | WO 97/32904 | 9/1997 |
| WO | WO 98/49205 | 11/1998 |
| WO | WO 00/05275 | 2/2000 |
| WO | WO 00/05283 | 2/2000 |

OTHER PUBLICATIONS

T.G. Fox Bull. Am. Phy. Soc. (Ser II) 1, 123 (1956).
Ullmann's Enzyklopadie der Technischem Chemie, vol. 19, 4th edition, Verlag Chemie. Weinheim. 1980, pp. 17-18.
Ullmann's Encyclopedia of Industrial Chemistry, VCH, Weinheim, vol. A21 (1992), p. 169.

* cited by examiner

*Primary Examiner* — Kelechi Egwim
(74) *Attorney, Agent, or Firm* — Robert C. Morriss

(57) ABSTRACT

The present invention pertains to a process for the preparation of aqueous dispersions which are stabilized with a water-insoluble stabilizing colloid, characterized in that a) in a first step a water-insoluble stabilizing colloid is prepared, with this being prepared, based on the amount of monomer used for the preparation of the stabilizing colloid, by means of radical polymerization, followed by b) the addition of at least one further olefinically unsaturated monomer and at least one initiator, in which process by means of radical polymerization of the further olefinically unsaturated monomer an aqueous dispersion is obtained, on which c) optionally a residual monomer reduction is performed, with this being carried out by means of polymerization of residual monomers and/or by means of physical removal of the residual monomers and optionally further volatile organic components by means of the introduction of vapor and/or gas.

20 Claims, 1 Drawing Sheet

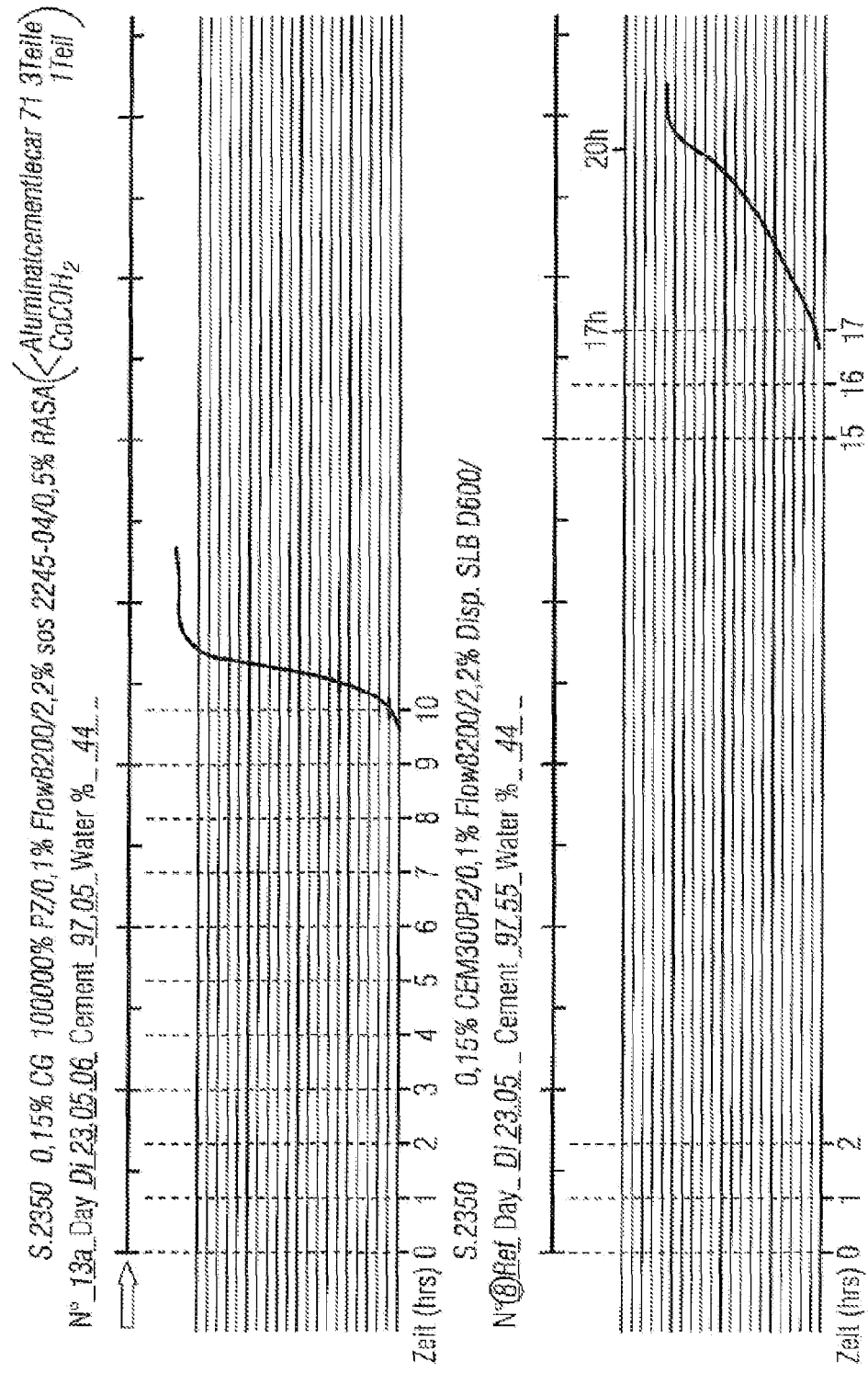

METHOD FOR PRODUCING DISPERSIONS AND USE THEREOF

The present invention pertains to a process for the preparation of aqueous dispersions which have been stabilised with a water-insoluble stabilising colloid, and to water-redispersible polymer powders obtainable therefrom, as well as the use thereof.

Aqueous dispersions, in particular when they are subsequently processed to water-redispersible polymer powders, are often stabilised with the aid of protective colloids. Such protective colloids as a rule are water-soluble and often also non-ionic. Typical representatives of such protective colloids are partially hydrolysed polyvinyl alcohols. However, they often have the drawback that they have a negative effect on the water resistance of the polymer film made from the dispersion or redispersion. For this reason various alternatives have already been proposed.

For instance, EP 1 098 916 A1 and EP 1 109 838 A1 describe a water-insoluble stabilising colloid which is prepared with the aid of cationic monomers and stabilises a subsequently prepared aqueous dispersion. Aqueous dispersions prepared in this way are easily converted into dispersion powders. Since these products are often used in formulations in which anionic compounds are also used, this can on a few occasions lead to undesired interactions between the cationic latex and the anionic compound. This is less the case with anionic stabilising systems. However, dispersions which already have a small share of carboxyl groups in the stabilising system, in particular in systems rich in calcium ions, such as for instance cementitious mortar, tend to calcium complexing, which brings about a very strong, undesired increase in viscosity. For that reason there were a few mixtures where monomers were copolymerised with sulfonate groups and/or sulfonic acid groups.

Thus EP 725 092 A2 and DE 195 06 331 A1 describe redispersible, powdery core-shell polymers consisting of a core polymerisate made up of 80 to 100 wt. % of monomers from the group of acrylates and 0 to 20 wt. % of ethylenically unsaturated sulfonic acid compounds and a shell polymerisate made up of 60 to 95 wt. % of monomers from the group of acrylates and 5 to 40 wt. % of ethylenically unsaturated sulfonic acid compounds. The preparation takes place by way of a classic core-shell emulsion polymerisation, in which first the core-polymer and subsequently the shell-polymer is prepared and the monomers are dosed by way of a pre-emulsion stabilised with the aid of emulsifiers. The glass transition temperature Tg preferably is set such that at the core polymerisate it is about −65 to +30° C., and at the shell polymerisate it should be above +60° C. The ethylenically unsaturated sulfonic acid compounds are compounded with the other monomers of the monomer phase in question and thus as a rule dosed in the protonated form. Since these dispersions have been stabilised with the aid of emulsifiers, there is a risk of a reduced redispersion or—if the glass transition temperature of the shell polymer is set correspondingly high—of poor film forming after the redispersion.

WO 98/49205 A1 describes a process for the preparation of protective colloid-stabilised aqueous polymer dispersions, wherein the polymerisation is carried out in the presence of a typically water-soluble protective colloid containing 5 to 95 wt. % sulfonic acid groups- or sulfonate groups-containing monomer units, 5 to 95 wt. % non-crosslinkable, water-soluble monomer units, and 0 to 5 wt. % hydrophobic, water-insoluble monomer units. In WO 97/32904 A1 water-soluble, crosslinkable protective colloids are described which contain 20 to 95 wt. % sulfonic acid groups- or sulfonate groups-containing monomer units, 4 to 80 wt. % N-methylol groups- or N-alkoxymethyl groups-containing monomer units, and 0.1 to 20 wt. % of hydrophobic monomer units from the group of water-insoluble monomers and the hydrophobic end groups of initiator residues or regulatory molecules. In both cases the water-soluble protective colloid is prepared in the presence of acetone, which is distilled off after the reaction. In order to free the obtained polymerisate completely of acetone residues remaining behind, however, considerable costs have to be incurred. Moreover, an essential share of the used monomers is based on (meth)acrylamides, which in the alkaline pH range can easily set free amines and/or ammonia, which leads to undesired effects in the final application. Furthermore, there is the possibility that the protective colloid prepared in this way can lack a stabilising effect on the subsequently prepared dispersion, which results in particular in a lack of storage stability and redispersion of the dried, water-redispersible dispersion powder.

The object thus is to provide a stabilising system for aqueous dispersions which to a large extent circumvents the drawback of the prior art. In particular, the dispersions and water-redispersible polymer powders stabilised therewith should have a good compatibility with other raw materials. Furthermore, it should be possible with the aid of a flexible preparative process to easily attain a core-shell morphology and to easily control the properties to be obtained in the matrix in question. In addition, the obtained dispersions and polymer powders should be usable in diverse ways.

Surprisingly, it was found that this problem can be solved with a process for the preparation of aqueous dispersions which can easily be converted into water-redispersible polymer powders, with the aqueous dispersions having been stabilised with a water-insoluble stabilising colloid, wherein a) in a first step a water-insoluble stabilising colloid is prepared, with this being prepared, based on the amount of monomer used for the preparation of the stabilising colloid, by means of radical polymerisation of a1) about 1 to 90 wt. % of at least one olefinically unsaturated monomer, containing at least one sulfate and/or sulfonate group, which optionally may be protonated, a2) about 5 to 99 wt. % of at least one olefinically unsaturated monomer with a water solubility at 20° C. of less than 50 g/l, and a3) up to 50 wt. % of at least one olefinically unsaturated monomer with a water solubility at 20° C. of more than 50 g/l, in water, followed by b) the addition of at least one further olefinically unsaturated monomer and at least one initiator, in which process by means of radical polymerisation of the further olefinically unsaturated monomer an aqueous dispersion is obtained, on which c) optionally a residual monomer reduction is performed, with this being carried out by means of polymerisation of residual monomers and/or by means of physical removal of the residual monomers and optionally further volatile organic components by means of the introduction of vapour and/or gas.

For the preparation of the water-insoluble stabilising colloid are used, based on the amount of monomer used for the preparation of the stabilising colloid, preferably about 3 to 50 wt. %, in particular about 5 to 30 wt. %, of at least one olefinically unsaturated monomer mentioned under a1), containing at least one sulfate and/or sulfonate group which optionally may be protonated. Moreover, preferably about 20 to 97 wt. %, in particular about 50 to 95 wt. %, of at least one olefinically unsaturated monomer mentioned under a2) with a solubility in water at 20° C. of less than 50 g/l, and preferably up to about 30 wt. %, in particular up to about 20 wt. %, of at least one olefinically unsaturated monomer mentioned under a3) with a solubility in water at 20° C. of more than 50 g/l, are converted in water with the aid of radical polymerisation. The olefinically unsaturated monomers mentioned under a3) can be used, but do not have to be.

Suitable monomer units of the group a1) are olefinically unsaturated monomers containing at least one sulfate and/or sulfonate group, which optionally may be protonated. Non-limiting examples are 2-acrylamido-2-methylpropane sulfonic acid (AMPS), styrene sulfonic acid, (meth)acrylic acid-sulfoalkyl esters, itaconic acid-sulfoalkyl esters, preferably always as $C_1$- to $C_6$-alkyl esters, vinyl sulfonic acid and the alkali, alkaline earth and/or ammonium salts thereof. Preferred are monomers containing a (meth)acrylate, a (meth)acrylamide and/or a vinyl group, in particular 2-acrylamido-2-methylpropane sulfonic acid (AMPS), styrene sulfonic acid, acrylic acid sulfopropyl ester, itaconic acid sulfopropyl ester, vinyl sulfonic acid, as well as the respective ammonium, sodium, potassium and/or calcium salts thereof.

Suitable monomer units of group a2) are olefinically unsaturated monomers with a solubility in water at 20° C. of less than 50 g/l. Preferred are linear or branched $C_1$- to $C_{20}$-vinyl esters, ethylene, propylene, vinyl chloride, (meth)acrylic acid and the linear or branched $C_1$- to $C_{20}$-alkyl esters thereof, styrene, styrene derivatives and/or dienes, such as for instance 1,3-butadiene. Quite especially preferred vinyl esters are linear or branched $C_1$- to $C_{12}$-vinyl esters, such as for instance vinyl acetate, vinyl propionate, vinyl laurate, vinyl-2-ethyl-hexanoate and/or $C_9$-, $C_{10}$- and/or $C_{11}$-vinyl versatate. Quite especially preferred (meth)-acrylates are methyl methacrylate, n-butyl acrylate, t-butyl methacrylate, iso-butyl methacrylate, and 2-ethylhexyl methacrylate.

Suitable monomer units of group a3) are olefinically unsaturated monomers with a solubility in water at 20° C. of more than 50 g/l. Preferred are monomers with amide, amine and/or hydroxyl groups. Especially preferred are hydroxyalkyl (meth)acrylates, such as hydroxyethyl acrylate, hydroxypropyl acrylate and/or hydroxybutyl acrylate, acrylamide, methacrylamide and/or (meth)acrylate and N-substituted (meth-)acrylamides containing polyalkylene oxide and/or polyalkylene glycol groups.

Moreover, it is also possible that in the preparation of the water-insoluble stabilising colloid at least one olefinically unsaturated monomer is copolymerised with a further reactive group. Preferred reactive groups for such monomers are epoxy, epihalohydrin, amine, ammonium, hydroxyl, aldehyde, ketone, acid anhydride, acetoacetonate, carboxyl, thiol, alkoxysilane, silanol, glycidyl, N-methylol, sulfonic acid, amide, amidine, imine, ester and/or carbonyl groups, with alkoxysilane, epoxy, epihalohydrin and/or amine groups being quite especially preferred. In a special embodiment the further reactive group is likewise olefinically unsaturated and can react with further olefinically unsaturated monomers with the aid of radical polymerisation. In the case of such monomers it is preferred when the further reactive group has a lower reactivity than the first reactive group. Examples of such monomers are divinyl adipate, diallyl maleate, allyl methacrylate or triallyl cyanurate, divinyl benzene, butanediol-1,4-dimethacrylate, triethylene glycol dimethacrylate, and hexane diol diacrylate.

The proportion by weight of the monomers with reactive groups, based on the total amount of monomers used for the preparation of the stabilising colloid, is about 0.01 to 50 wt. %, preferably about 0.1 to 30 wt. %, in particular about 0.5 to 20 wt. %. The solubility in water of these monomers is unimportant and at 20° C. it can be more or less than 50 g/l.

Preferred olefinically unsaturated monomers with a further reactive group are triethylene glycol dimethacrylate, hexane diol diacrylate, functional vinyl and/or (meth)acrylate monomers containing alkoxysilane, glycidyl, epihalohydrin, carboxyl, amine, hydroxyl, ammonium groups, hydroxypropyl (meth)acrylate, N-methylolallyl-carbamate, methylacrylamidoglycolic acid methyl ester, N-methylol (meth)acrylamide, acrylamido-glycolic acid, glycidyl(meth)acrylate, (meth)acryloxypropyl trialkoxy silane, vinyl trialkoxy silane, vinyl methyl dialkoxy silane, with methoxy, ethoxy and/or iso-propoxy groups preferably being used as alkoxy groups, acetyl acetoxyethyl(meth)acrylate, diacetone acrylamide, methyl acrylamidoglycolic acid and the alkyl esters thereof, N-methylol (meth)acrylamide, N-methylol allyl carbamate, esters of N-methylol (meth)-acrylamide and N-methylol allyl carbamate, N-[3-(dimethylamino)propyl] methacrylamide, N-[3-(dimethylamino)ethyl]methacrylate, N-[3-(trimethyl ammonium)propyl]methacrylamide-chloride and/or N,N-[3-chloro-2-hydroxy-propyl)-3-dimethyl-ammonium-propyl]meth)acrylamide-chloride, in which process in particular in the case of cationic monomers the amount is chosen such that no negative interaction with the anionic monomers, such as for instance coagulation, takes place.

The water-insoluble stabilising colloid formed in the first step during and after the addition of at least one further olefinically unsaturated monomer and at least one initiator serves to stabilise the aqueous dispersion which is formed by means of radical polymerisation in water of the further olefinically unsaturated monomers. Depending on the composition and the particle size of the water-insoluble stabilising colloid, the addition of the further olefinically unsaturated monomers leads to a radical emulsion, suspension and/or microemulsion polymerisation. This can be carried out in a continuous, a monomer feed and/or a batch process, in which case in the monomer feed process the monomers can also be dosed in the form of a pre-emulsion. In this way both homo- and copolymerisates can be stabilised.

It is preferred if these further monomers have a solubility in water at 20° C. of less than 50 g/l. Optionally, however, it is also possible for a small share of monomers to have a higher solubility in water.

Suitable monomers and monomer classes for the preparation of these homo- and copolymerisates are for instance linear or branched $C_1$- to $C_{20}$-vinyl esters, ethylene, propylene, vinyl chloride, (meth)acrylic acid and the linear or branched $C_1$- to $C_{20}$-alkyl esters thereof, (meth)acrylamide and (meth)acrylamide with N-substituted linear or branched $C_1$- to $C_{20}$-alkyl groups, acrylonitrile, styrene, styrene derivatives, such as alpha-methyl styrene, ortho-chlorostyrene or vinyl toluene and/or dienes, such as for instance 1,3-butadiene and isoprene. Preferred vinyl esters are linear or branched $C_1$- to $C_{12}$-vinyl esters, such as for instance vinyl acetate, vinyl stearate, vinyl formate, vinyl propionate, vinyl butyrate, vinyl pivalate, vinyl laurate, vinyl-2-ethylhexanoate, 1-methyl vinyl acetate and/or $C_9$-, $C_{10}$- and/or $C_{11}$-vinyl versatate, vinyl pyrrolidone, N-vinyl formamide, N-vinyl acetamide, as well as vinyl esters of benzoic acid and p-tert-butyl benzoic acid, with vinyl acetate, vinyl laurate and/or vinyl versatate being preferred in particular. Preferred $C_1$- to $C_{12}$-alkyl groups of the (meth)acrylates and N-substituted (meth)acrylamides are methyl, ethyl, propyl, n-butyl, i-butyl, t-butyl, hexyl, cyclohexyl, 2-ethylhexyl, lauryl, stearyl, norbornyl, polyalkylene oxide and/or polyalkylene glycol groups, in particular methyl, butyl, 2-ethylhexyl groups. Particularly preferred are methyl methacrylate, n-butyl acrylate, t-butyl methacrylate, and 2-ethylhexyl methacrylate.

Moreover, further monomers, in particular monomers with functional groups, can be incorporated into the polymer. For instance, maleic anhydride, unsaturated dicarboxylic acids and the branched or linear $C_1$- to $C_{20}$-esters thereof, in particular itaconic acid, maleic acid and/or fumaric acid and the esters thereof, ethylenically polyunsaturated comonomers, such as for instance divinyl adipate, diallyl maleate, allyl methacrylate or triallyl cyanurate, divinyl benzene, butanediol-1,4-dimethacrylate, triethylene glycol dimethacrylate, hexane diol diacrylate, functional vinyl and/or (meth)acrylate monomers containing alkoxysilane, glycidyl, epihalohydrin, carboxyl, amine, hydroxyl, ammonium and/or sulfonic acid groups can be copolymerised. Preferred functional monomers are hydroxypropyl(meth)acrylate, N-methylol allyl carbamate, methylacrylamidoglycolic acid methyl ester, N-methylol (meth)acrylamide, vinyl sulfonic acid, acrylamidoglycolic acid, glycidyl (meth)acrylate, 2-acrylamido-2-methyl-propane sulfonic acid, (meth)acryloxy-propyl tri(alkoxy)silane, vinyl trialkoxysilane, vinyl-methyl dialkoxysilane, with methoxy, ethoxy and/or iso-propoxy groups preferably being used as alkoxy groups, acetylacetoxyethyl(meth)acrylate, diacetone-acrylamide, acrylamido-glycolic acid, methylacrylamidoglycolic acid methyl ester, alkyl ether, N-methylol(meth)acrylamide, N-methylol allyl carbamate, esters of N-methylol (meth)acrylamide and N-methylol allyl carbamate, N-[3-(dimethylamino)propyl]-methacrylamide, N-[3-(dimethylamino)ethyl]methacrylate. The share of these comonomers, based on the overall monomer content, preferably is about 0 to 30 wt. %, in particular about 0 to 20 wt. %, and quite especially preferably about 0.1 to 10 wt. %, with care having to be taken in particular that the share of free carboxyl groups preferably is not higher than about 10 wt. %, in particular not higher than about 5 wt. %, and quite especially preferably not higher than about 3 wt. %.

In this way aqueous dispersions can be prepared which preferably contain polymerisates or copolymerisates based on vinyl acetate, ethylene-vinyl acetate, ethylene-vinyl acetate-vinyl versatate, ethylene-vinyl acetate-vinyl chloride, ethylene-vinyl chloride, vinyl acetate-vinyl versatate, ethylene-vinyl acetate-(meth)acrylate, vinyl acetate-vinyl versatate-(meth)acrylate, (meth)-acrylate, vinyl acetate-maleic acid and vinyl acetate-maleic acid-ester, vinyl acetate-vinyl versatate-maleic acid and vinyl acetate-vinyl versatate-maleic acid-ester, vinyl acetate-(meth)acrylate-maleic acid and vinyl acetate-(meth)acrylate-maleic acid ester, styrene-acrylate and/or styrene-butadiene, with vinyl versatate being a $C_4$- to $C_{12}$-vinyl ester.

The selection with regard to the initiator system required for the polymerisation is not subject to any essential restrictions either for the preparation of the water-insoluble stabilising colloid or for the preparation of the aqueous dispersion. Thus all initiator systems known in the mentioned types of polymerisations can be used. Preferably, however, initiators are used which form radicals under the reaction conditions. These include thermal initiator systems, such as persulfates, for instance potassium, sodium or ammonium persulfate, water- and monomer-soluble azo initiators, such as azobisisobutyronitrile, azobiscyanovaleric acid, and 2,2'-azobis(2-methylpropion-amidine) dihydro-chloride, redox-initiator systems consisting of oxidation agents, such as for instance hydrogen peroxide, t-butyl hydroperoxide, t-butyl peroxide, isopropyl benzene monohydroperoxide, cumene hydroperoxide, t-butyl peroxopivalate, dibenzoyl peroxide, bicyclohexyl peroxydicarbonate and dicetyl peroxydicarbonate, and reducing agents, such as for instance sodium, potassium, ammonium, sulfite and disulfite, sodium, potassium, and zinc formaldehyde sulfoxylate, as well as ascorbic acid, in which case optionally also oxidation agents which can form free radicals with the aid of thermal decomposition can be used alone, as well as catalytic initiator systems, such as for instance the system $H_2O_2/Fe^{+2}/H^+$. The share of initiators, based on the monomer content, preferably is between about 0.01 and 5 wt. %, in particular between about 0.1 and 3 wt. %.

It is preferred when in the preparation of the water-insoluble stabilising colloid, and of the dispersions stabilised therewith, no emulsifiers are used or these are used in an amount of less than about 3 wt. %, preferably of less than about 2 wt. %, in particular of less than about 1 wt. % of emulsifiers, based on the monomer content of the water-redispersible dispersion powder.

Suitable emulsifiers, if such are used, can be non-ionic, anionic, cationic and/or amphoteric in nature, with in particular cationic emulsifiers being less preferred. For instance, alkyl sulfonates, alkylaryl sulfonates, alkyl sulfates, sulfates of hydroxyl alkanols, alkyl and alkylaryl disulfonates, sulfonated fatty acids, sulfates and phosphates of polyethoxylated alkanols and alkyl phenols, as well as esters of sulfosuccinic acid, polyaddition products, such as polyalkoxylates, for instance adducts of 5 to 50 moles of ethylene oxide and/or propylene oxide per mole of linear and/or branched $C_6$- to $C_{22}$-alkanols, alkyl phenols, fatty acids, fatty acid amines, primary and/or secondary alkyl amines can be used, with the alkyl group always preferably being a linear and/or branched $C_6$- to $C_{22}$-alkyl group.

In the polymerisation of the water-insoluble stabilising colloid and/or the aqueous dispersion chain transfer agents can be used to optimally set the product properties. As a rule it is preferred when these are already added at the synthesis of the stabilising colloid. The optimal amount to be used is determined, next to the molecular weight to be obtained, above all on the basis of the chain transfer agent(s) used and is about 0.01 to 5 wt. %, in particular about 0.05 to 2.5 wt. %, based on monomers of the stabilising colloid or on the further monomer which is added to form the aqueous dispersion. Suitable chain transfer agents can be used alone or in combination and are methanol, ethanol, propanol, and butanol, ketones with 2 to 8 carbon atoms, such as for instance acetone, methylethyl ketone, cyclohexane, acetaldehyde, propion aldehyde, n-butyl aldehyde, benzaldehyde, and mercaptans, such as dodecyl mercaptan, lauryl mercaptan, thioglycolic acid, octyl thioglycolate, and thioglycerol. Preferred chain transfer agents are mercaptans, such as dodecyl mercaptan and lauryl mercaptan. Furthermore, it is also possible to set the molecular weight of the polymer phase in question with the aid of other parameters, such as by means of the initiator concentration and/or the reaction conditions, such as temperature and/or monomer dosing rate.

The water-insoluble stabilising colloid and the subsequently prepared aqueous dispersion are not subject to any real restrictions with regard to the process parameters. Thus the temperature can be between about 20 and 110° C., preferably between about 50 and 100° C., in particular between about 60 and 95° C. The respective reaction pressures essentially depend upon the monomers to be polymerised. When these are liquid at the reaction temperature, then as a rule a light vacuum or standard pressure suffices. When gaseous monomers, such as for instance ethylene, are copolymerised, they can be up to 100 bar or more.

The preparation of the dispersion as a rule takes place as a 2- or more-step polymerisation, wherein the first step is the preparation of the water-insoluble stabilising colloid. By means of suitable process control and pertinent selection of the monomers dosed subsequently, the heterogeneity of the aqueous dispersion can be set as desired.

The share of water-insoluble stabilising colloid prepared in the first step, based on the solids content of the dispersion being obtained, as a rule is about 2 to 50 wt. %, preferably about 5 to 40 wt. %, in particular about 10 to 30 wt. %.

As a rule it is preferred when the obtained aqueous dispersions, and also the water-insoluble stabilising colloid if it is used further as such separately, have a low share of volatile organic components (VOC). By these are meant organic components which have a boiling point of less than 250° C. at standard pressure. These include for instance unreacted monomers and unpolymerisable contaminants contained in the monomers and side-products of the polymerisation. The VOC-content conveniently is less than about 2,000 ppm, preferably less than about 1,000 ppm, in particular less than about 500 ppm and quite especially preferably less than about 250 ppm, based on the solids content of the aqueous dispersion or of the water-insoluble stabilising colloid. Ideally, the conduct of the reaction for the preparation of the aqueous dispersion and/or the water-insoluble stabilising colloid is chosen such that no further residual monomer reduction has to be carried out. When this is necessary, however, it can be carried out by means of subsequent polymerisation of the residual monomers and/or by means of physical removal of the residual monomers and, optionally, further volatile organic components with the aid of the introduction of vapour and/or gas.

The particle size of the water-insoluble stabilising colloid is about 50 to 2,000 nm, preferably about 80 to 1,000 nm, in particular about 100 to 500 nm, and of the obtained dispersion it is about 0.1 to 5 μm, preferably about 0.2 to 2 μm, in particular about 0.25 to 1.5 μm, with the particle size being measured with the aid of light scattering and indicated as volumetric mean.

It is not necessary for the zeta potential of the water-insoluble stabilising colloid and the aqueous dispersion to be highly pronounced. Hence as a rule a zeta potential, measured in the electric field, of about −2.5 mV or less, preferably of about −5 mV or less, in particular of about −7.5 mV or less, suffices.

The solids content of the water-insoluble stabilising colloid as a rule is about 15 to 75 wt. %, preferably about 30 to 70 wt. %, in particular about 40 to 65 wt. %, and of the aqueous dispersion it is about 30 to 75 wt. %, preferably about 40 to 70 wt. %, in particular about 45 to 65 wt. %.

From the used monomers in each case the glass transition temperature $T_g$ of the prepared copolymerisates and thus of the emulsion polymerisates can be calculated empirically as well as determined experimentally. They can be calculated empirically with reference to the known Fox equation (T. G. Fox, *Bull. Am. Phy. Soc.* (serII) 1, 123 (1956) and *Ullmann's Encyclopedia of Technical Chemistry*, Vol. 19, 4th Ed., Verlag Chemie, Weinheim, 1980, pp. 17/18): $1/T_g = x_A/T_{gA} + x_B/T_{gB} + \ldots + x_n/T_{gn}$, wherein $x_A, x_B \ldots$ are the mass fractions of the used monomers A, B, ... (in wt. %) and $T_{gA}, T_{gB}, \ldots$ are the glass transition temperatures $T_g$ in Kelvin of the respective homopolymerisates of A, B, .... These are for instance listed in *Ullmann's Encyclopedia of Industrial Chemistry*, VCH, Weinheim, Vol. A21 (1992), p. 169. Another possible way of determining the glass transition temperatures $T_g$ of the copolymerisates is the experimental determination, for instance by means of DSC, wherein the midpoint temperature should be taken into consideration (midpoint temperature in accordance with ASTM D3418-82).

For an advantageous implementation of the invention it is preferred that the glass transition temperature $T_g$, measured as midpoint temperature in accordance with ASTM D3418-82, of the water-insoluble stabilising colloid used to stabilise the dispersion is between about 0 and 80° C., preferably between about 5 and 70° C., in particular between about 10 and 60° C., and the glass transition temperature $T_g$ of the subsequently prepared homo- or copolymerisate of the aqueous dispersion is between about −50 and +80° C., preferably between about −40 and +50° C., in particular between about −20 and +30° C., with it often being advantageous when the glass transition temperature of the water-insoluble stabilising colloid is higher than that of the subsequently prepared polymerisate.

Often it is preferred when the dispersion in use forms a film. In this case the Minimum Film Forming Temperature (MFFT) of the 50% aqueous dispersion composition in accordance with DIN 53787 should conveniently be lower than about +30° C., preferably lower than about +20° C., in particular lower than about +10° C. When the Minimum Film Forming Temperature is too high, it is also possible to add film forming adjuvant to the dispersion in amounts of up to about 5 wt. %, in particular up to about 2 wt. %, based on the solids content of the dispersion.

Surprisingly, the aqueous dispersion according to the invention is very suitable for the preparation of water-redispersible polymer powders. To this end it is often helpful when one or several more water-soluble polymers which have a non-ionic, anionic, cationic or amphoteric character are added to the aqueous dispersion, with non-ionic and anionic polymers being preferred. The share of these polymers as a rule is about 1 to 15 wt. %, based on the solids content of the dispersion, but can be higher or lower if need be. Often amounts of about 3 to 8 wt. % are preferred.

Suitable water-soluble polymers are for instance one or several polyvinyl pyrrolidones and/or polyvinyl acetals with a molecular weight of 2,000 to 400,000, fully or partially saponified and/or modified fully or partially saponified polyvinyl alcohols with a degree of hydrolysis of preferably about 70 to 100 mol. %, in particular of about 80 to 98 mol. %, and a Höppler viscosity in 4% aqueous solution of preferably 1 to 100 mPas, in particular of about 3 to 50 mPas (measured at 20° C. in accordance with DIN 53015), as well as melamine formaldehyde sulfonates, naphthaline formaldehyde sulfonates, block copolymerisates of propylene oxide and ethylene oxide, styrene-maleic acid and/or vinyl ether-maleic acid copolymerisates.

The subsequent drying preferably takes place by means of spray drying, freeze drying, fluidised bed drying, drum drying and/or flash drying. Spray drying is especially preferred, with inlet temperatures between about 120 and 180° C. and outlet temperatures between about 50 and 100° C. being advantageous in many cases.

To the aqueous dispersion and/or the water-redispersible polymer powder further additives can be added before, during and/or after the drying, such as polymer dispersions, hydrophobising agents, in particular fatty acids and the salts and esters thereof, silanes and/or siloxanes, air-entraining agents, wetting agents, anti-foaming agents, film-forming adjuvants, setting and solidification accelerators, setting retarders, thickening agents, biocides, dispersing agents, cement condensers, polycarboxylates, polycarboxylate ethers, polyacrylamides, water retention agents, cellulose fibres and cellulose ethers, starch ethers, guar ethers, additives for the reduction of efflorescence, sedimentation and/or bleeding, powdery, water-soluble polymers, such as one or several polyvinyl pyrrolidones and/or polyvinyl acetals with a molecular weight of 2,000 to 400,000, fully or partially saponified and/or modified fully or partially saponified polyvinyl alcohols with a degree of hydrolysis of preferably about 70 to 100 mol.

%, in particular of about 80 to 98 mol. %, and a Höppler viscosity in 4% aqueous solution of preferably 1 to 100 mPas, in particular of about 3 to 50 mPas (measured at 20° C. in accordance with DIN 53015), fillers, pigments as well as powders which have an alkaline reaction with water, such as for instance oxides and/or hydroxides of alkali and/or alkaline earth salts, such as for instance calcium hydroxide, calcium oxide, sodium and/or potassium hydroxide and aluminium hydroxide and/or additives for the reduction of the powder blocking. Liquid components are preferably added before or during the drying, but can also be sprayed onto the powder subsequently. Powdery components are preferably added during or after the spray drying, but can also be added to the liquid dispersion before the drying step.

As silanes, silane esters, silicones and/or siloxanes in principle all organosilicon compounds can be used. It is advantageous, but not mandatory, however, when the boiling point at standard pressure of the used organosilicon compound is not too low, preferably about 100° C. or more. The organosilicon compounds can be water-soluble, water-insoluble or only partially soluble in water. Preferred in this case are compounds which have no or only a limited solubility in water. These can be silicic acid esters of the formula $Si_n(OR')_4$, organoxysilanes of the formula $Si_n(OR')_{4-n}$, with n=1 to 3, polysilanes of the formula $R_3Si(SiR_2)_nSiR_3$ with n=0 to 500, wherein n=0 to 8 is preferred, di-, oligo-, and polysiloxanes made up of units of the general formula $R_cH_dSi(OR')_e(OH)_f O_{(4-c-d-e-f)/2}$ with c=0 to 3, d=0 to 2, e=0 to 3, f=0 to 3, and the sum c+d+e+f per unit is at most 3.5, wherein R' stands for the same or different alkyl groups or alkoxyalkylene groups with 1 to 4 C-atoms, preferably means methyl or ethyl, and R may be the same or different and stands for branched or unbranched alkyl groups with 1 to 22 C-atoms, cycloakyl groups with 3 to 10 C-atoms, alkylene groups with 2 to 4 C-atoms, aryl, aralkyl, alkylaryl groups with 6 to 18 C-atoms, wherein said groups R can also be substituted with halogens, such as F or Cl, with ether, thioether, ester, amide, nitrile, hydroxyl, amine, carboxyl, sulfonic acid, carboxylic anhydride, and carbonyl groups, wherein in the case of the polysilanes R can also have the meaning OR'.

A special embodiment is the addition of at least one further organic component with functional groups. When this component is liquid, it is preferably added to the aqueous dispersion or the water-redispersible polymer powder during the preparation thereof or converted to the powder form. When it is powdery, it can be mixed with the water-redispersible polymer powder during or after the drying, or be mixed with the aqueous dispersion in dissolved or dispersed form. The organic component with functional groups preferably reacts in an alkaline medium with itself and/or another compound. Examples of such compounds are crosslinking agents, such as epoxides, epoxy resins, oligo- and/or polyamines, difunctional masked aldehydes with at least 3 carbon atoms, silanes, siloxanes, isocyanates, which optionally may be used together with hydroxy compounds, such as polyols, boric acid and/or borax and/or compounds with carbodiimide, carboxyl and/or epichlorohydrin groups.

Quite especially preferred further additives are polysaccharide ethers, in particular cellulose and/or starch ethers, hydrophobising agents, such as silanes, silane esters, fatty acids and the salts and esters thereof, agents for the reduction of efflorescence, in particular based on natural resins, cellulose fibres, anti-foaming agents and/or pigments.

The share of further additives, based on the solids content of the dispersion or based on the polymer-powder, can be very small for example surface-active substances and be in the range of about 0.01 wt. % or more, in particular about 0.1 wt. % and more, but as a rule should not exceed about 10 wt. %, in particular about 5 wt. %. On the other hand, the share of for example mixed-in pigments can be higher and even exceed 100 wt. %.

The water-insoluble stabilising colloid according to the invention can not only be used for stabilising aqueous dispersions prepared with the aid of radical polymerisation. Rather, it can be used otherwise, such as for instance for stabilising silane and/or siloxane dispersions, resin acid dispersions, colophonium and colophonium ester dispersions, as spraying adjuvant and/or for encapsulation of further organic and/or inorganic compounds, in particular hydrophobic and/or water-insoluble materials.

The aqueous dispersions and water-redispersible polymer powders according to the invention are preferably used as organic polymeric binder in minerally setting systems, in particular in hydraulically, latent-hydraulically, and non-hydraulically setting systems, with the last reacting under the influence of air and water, as well as in non-minerally setting systems, in particular in cement-free plasters, in paints, such as dispersion paints, printing inks/or inkjet inks, textiles, adhesives, as binders for wood, nonwovens, paper and the production thereof, and/or as binders of moulded articles and shaped bodies.

Preferably, the minerally setting systems containing the aqueous dispersions and/or water-redispersible polymer powders according to the invention are used as ceramic tile adhesives, thermal insulation mortars, levelling compounds, repair mortars, gypsum and/or lime and/or cement plasters, tile grouts, sealing compounds, trowelling compounds, wallpaper pastes, parquet adhesives, powder paints, bonding mortars, primers and/or as cement-based compounds for oil, natural gas and/or terrestrial heat boreholes.

The invention is further elucidated with reference to the following Examples, with use being made of the following abbreviations:

AMPS a 50 wt. % aqueous solution of the sodium salt of 2-acrylamido-2-methylpropane sulfonic acid (Lubrizol monomer AMPS 2403)
MMA methyl methacrylate
BA butyl acrylate
ALMA allyl methacrylate
DT 1-dodecane thiol
APS ammonium persulfate
TBHP-70 a 70 wt. % aqueous solution of tert-butyl hydroperoxide
SFS sodium formaldehyde sulfoxylate
PVOH partially hydrolysed polyvinyl alcohol with a degree of hydrolysis of 88 mol. % and a Höppler viscosity in 4% aqueous solution of 4 mPas

EXAMPLE 1

A) Preparation of a Water-insoluble Stabilising Colloid SK-1 and Subsequently of the Dispersion Disp-1

2.0 [g] AMPS, 0.3 g DT, and 350 g water were charged to a 2-litre polymerisation reactor with a mechanical stirrer and heated to 85° C. One minute after the addition of a solution of 0.12 g APS, dissolved in 6.2 g of water, the parallel dosing of 42 g AMPS, the mixture composed of 80 g MMA, 40 g BA, and 2.4 g DT, and a solution of 0.12 g APS, dissolved in 6.2 g water, was started and there was continuous dosing for one hour. Next, there was full reaction for a further half hour at reaction temperature. The obtained water-insoluble stabilising colloid is obtained as a white low-viscous dispersion.

The reactor temperature was subsequently set to 75° C. After the separate, immediate addition of 3 g TBHP-70 and a solution of 0.2 g SFS, dissolved in 20 g water, a monomer mixture composed of 260 g MMA, 340 g BA, and 0.6 g ALMA was dosed continuously for 2 hours and a solution of 1.8 g SFS, dissolved in 60 g water, was dosed continuously for 2.5 hours. After the end of the monomer dosing 0.57 g TBHP-70 was added. After the end of the SFS dosing and after an exothermic reaction was no longer observed, the addition of 12 g MMA, 0.37 g TBHP-70 took place, as well as that of 0.26 g SFS, dissolved in 5 g water, with the temperature being raised to 90° C. at the same time. After a further 30 minutes at this temperature there was cooling to room temperature. Obtained was a white dispersion with a solids content of 63 wt. %, a Brookfield viscosity at 23° C. of 1,700 mPas, a pH-value of 2.1, and a particle size (volumetric mean) of the latex particles of 0.85 μm.

B) Preparation of the Water-Redispersible Polymer Powder PP-1

457.1 g of dispersion Disp-1 and 49.2 g of a 25 wt. % aqueous solution of PVOH were mixed and diluted with water to a solids content of 25 wt. %. This mixture was dried with the aid of conventional spray drying at a start temperature of 120° C. to a white, free-flowing, readily water-redispersible powder, in which process no contamination worth mentioning could be established in the spraying tower and the yield was in the normal range. The powder being obtained was subsequently compounded with 18 wt. % of a commercially available carbonate. A subsequently prepared powder film with a 50 wt. % aqueous redispersion showed good values in a stress-strain measurement carried out subsequently. This can be attributed to a good redispersion on the one hand and a subsequent good film forming on the other.

EXAMPLE 2

A) Preparation of the Water-insoluble Stabilising Colloid SK-2

12 g AMPS, 1.8 g DT, 685 g water were charged to a 2-litre polymerisation reactor with a mechanical stirrer and heated to 85° C. One minute after the addition of a solution of 7 g APS, dissolved in 30 g water, the parallel dosing of 252 g AMPS, the mixture composed of 480 g MMA, 240 g BA, and 14.4 g DT, as well as of a solution of 7 g APS, dissolved in 30 g water, was started and there was continuous dosing for one hour. Next, there was full reaction for a further half hour at reaction temperature. Obtained was a water-insoluble stabilising colloid in the form of a white low-viscous dispersion with a solids content of 50 wt. %, a particle size (volumetric mean) of the stabilising colloid particles of 0.36 μm, and a Brookfield viscosity of 190 mPas, measured at 23° C. with Spindle 2 at 100 rpm.

B) Preparation of Dispersion Disp-2

275 g of the prepared water-insoluble stabilising colloid SK-2 and 240 g water were charged to a 2-litre polymerisation reactor with a mechanical stirrer and heated to 75° C. After the addition of 5 g TBHP-70 and 0.2 g SFS, dissolved in 20 g water, the separate dosing was started of a monomer mixture consisting of 260 g MMA, 340 g BA, and 0.6 g ALMA over 2 hours, and of 1.8 g SFS, dissolved in 180 g water, over 2.5 hours. After the end of the monomer dosing a further 0.57 g TBHP-70 was added. After the end of the SFS dosing and after no exothermic reaction was observed anymore, the addition of 12 g MMA, 0.37 g TBHP-70, and 0.26 g SFS dissolved in 5 g water took place. At the same time the temperature was raised to 90° C. After a further 30 minutes there was cooling to room temperature and unloading from the reactor. Obtained was a white low-viscous dispersion with a solids content of 57.0 wt. %, a particle size (volumetric mean) of the latex particles of 0.40 μm, and a Brookfield viscosity of 330 mPas, measured at 23° C. with Spindle 3 at 100 rpm.

C) Preparation of the Water-redispersible Polymer Powder PP-2

225 g of dispersion Disp-2 and 58 g of a 25 wt. % aqueous PVOH-solution were mixed and diluted with water to a solids content of 35 wt. %. These mixture was sprayed and mixed with filler in a manner analogous to that disclosed in Example 1B). The result was a white, free-flowing, readily water-redispersible powder, in which process no contamination worth mentioning could be established in the spraying tower and the yield was in the normal range.

COMPARATIVE EXAMPLE 1

Example 1 from laid-open patent application DE 195 06 331 A1 was repeated. 435.8 g of this dispersion were mixed with 82.6 g of a 25 wt. % aqueous PVOH-solution and diluted with water to a solids content of 25 wt. % and sprayed in a manner analogous to that of Example 1B). The result was a coarse, non-free-flowing powder in a very low yield of 20%, which does not redisperse in water even with vigorous stirring. No powder film could be prepared by means of a redispersion.

EXAMPLE 3

Application-specific Test in a Casein-free, Self-spreading Smoothing Compound

A dry mortar formulation was prepared according to Table 1, which was mixed with 21 wt. % water, based on the dry mortar. To this end in each case 100 g of the dry mortar formulation were stirred with a 60 mm propeller stirrer with a speed of 950 rpm for 60 seconds, with the corresponding amount of mixing water being added with stirring. After a maturing time of 3 minutes, the mortar was mixed thoroughly with the stirrer for another 15 seconds before the measuring. Thus the degree of spread was measured in accordance with EN 12706 and the flow time of the mortar in a Ford cup was determined with a 6 mm nozzle in accordance with DIN 53211.

TABLE 1

| Dry mortar formulation of the used smoothing compound | |
|---|---|
| PZ Anneliese Milke 52,5R premium | 23.00 wt. % |
| HAC Fondu Lafarge | 12.00 wt. % |
| lime | 1.00 wt. % |
| Hartformengips No. 1 (calcium sulfate alpha hemihydrate) | 4.10 wt. % |
| quartz sand 0.1-0.3 mm | 42.20 wt. % |
| calcium carbonate Omyacarb 10BG | 15.00 wt. % |
| setting retarder | 0.18 wt. % |
| powder defoamer | 0.12 wt. % |
| cellulose ether | 0.08 wt. % |
| lithium carbonate | 0.20 wt. % |
| polycarboxylate superplasticiser | 0.15 wt. % |
| polymer powder | 2.00 wt. % |

TABLE 2

Determination of the degree of spread in accordance with EN 12706 and the flow viscosity of the smoothing compound according to Table 1 in a Ford cup with a 6 mm nozzle in accordance with DIN 53211.

| polymer powder | degree of spread [mm] | | flow viscosity [sec] |
|---|---|---|---|
| | 5 min.[a] | 10 min.[a] | |
| Ref-1[b] | 155 | 154 | 42 |
| PP-1 | 154 | 153 | 65 |

[a]The ring was removed 5 and 10 minutes after the start of the mixing process, respectively.
[b]The reference polymer powder Ref-1 is a commercially available polymer powder common for this application based on a polyvinyl alcohol-stabilised ethylene-vinylacetate copolymerisate.

The rheological behaviour of the tested compound shows on the one hand that the degree of spread of the powder PP-1 according to the invention gives comparable values to commercially used powders. On the other hand, as a result of the use of PP-1 a so-called "honey-like" consistency of the smoothing compound is obtained, which is comparable with casein-containing smoothing compounds throughout. This is an extremely desirable property for the processor, since in particular the surface of the applied compounds smoothes itself, but this is hardly attainable for casein-free compounds.

EXAMPLE 4

Application-specific Test in a Cement-free Synthetic Resin Plaster

A dry mortar formulation according to Table 3 was prepared, which was mixed with water to a readily processable consistency. It was applied in a 1 mm thick, 6.8 cm wide, and 30 cm long layer onto a cement fibre board and stored for 2 days at 23° C. and 50% relative humidity.

TABLE 3

Dry mortar formulation of the used cement-free synthetic resin plaster. The amount of dispersion used is based on the solids content of the dispersion.

| | |
|---|---|
| Durcal 65 | 30.0 wt. % |
| quartz sand 0.1-0.5 mm | 51.7 wt. % |
| Kronos 2044 | 3.0 wt. % |
| powder defoamer | 0.1 wt. % |
| cellulose ether | 0.2 wt. % |
| dispersion/polymer powder | 15.0 wt. % |

The wet abrasive resistance was tested in accordance with DIN 53778 with a nylon brush scrubber and a 0.25 wt. % aqueous sodium dodecyl sulfate solution. After 2,000 friction cycles the specimens were dried and evaluated with the aid of a scale from 6 (no abrasion; very good) to 1 (abrasion to the undercoat; very bad).

TABLE 4

Amount of mixing water used for the dry mortar formulation of Table 3 and measured wet abrasive resistance of the synthetic resins plasters applied with different polymers

| | Disp-2 | PP-2 | Ref-2[c] |
|---|---|---|---|
| Amount of mixing water[a] | 21.5 | 20 | 21 |
| Wet abrasive resistance[b] | 55 | 4.5 | 2.5 |

[a]The amount of mixing water is given in wt. % and is based on the entire water content added, including the water contained in the dispersion.
[b]The evaluation scale goes from 6 "no abrasion; very good" to 1 "abrasion to the undercoat; very bad".
[c]The reference polymer powder Ref-2 is a commercially available polymer powder used for this application based on a polyvinyl alcohol-stabilised vinyl acetate-vinyl versatate copolymerisate.

EXAMPLE 5

Application-specific Test of the Setting Behaviour in a Cement Slurry

A dry cement formulation was prepared, with 97.2 wt. % cement of API class G (American Petroleum Institute), 2.2 wt. % water-redispersible polymer powder, 0.15 wt. % hydroxyethyl cellulose H100000YP2, and 0.5 wt. % of a sulfonated polycondensation product based on melamine being intermixed.

500 g of this formulation were mixed with water with a 60 mm propeller stirrer at a speed of 950 rpm for 60 seconds, with the mixing water being added with stirring. The amount of water was chosen such that a water-cement factor w/c of 0.44 resulted. After a maturing time of 3 minutes the mortar was again briefly stirred thoroughly by hand, with the setting behaviour subsequently being measured at 23° C. and 50% relative humidity with a Vicat set needle unit in accordance with DIN 1164.

In FIG. 1 (FIG. 1) the setting curves are represented, wherein the upper curve was obtained with the water-redispersible polymer powder PP-1. The setting started after about 10 hours and the setting ended after about 11¼ hours. The lower curve was measured with a commercially available styrene-butadiene dispersion which is used for cementing earth boreholes. The setting started after about 17 hours and the setting ended after about 20 hours. For comparison, moreover, a water-redispersible polymer powder Ref-3 was measured, which is a polymer powder based on a polyvinyl alcohol-stabilised aqueous styrene-acrylate dispersion, where the start of setting was after about 13 hours and the end of setting was after about 14½ hours.

The rapid hardening of the mortar after the start of setting is advantageous in many applications, such as for instance in the case of smoothing compounds, leading to a long processing time as well as a rapid hardening and thus an early walk-on stability. Through the use of the dispersion according to the invention or the polymer powder according to the invention these properties are obtained, without these having to be set expensively with the aid of control adjuvants which can be added to the dry cement formulation. Moreover, these properties find use also in earth borehole cementing, in particular when cementing oil, gas and/or terrestrial heat boreholes. Surprisingly, it was also found that even at elevated temperatures, for instance at 90° C. and 130° C., the dispersions and polymer powders according to the invention show a similar, in particular a right-angled setting behaviour, without the used dispersion or the used polymer powder gelling, as is the case with polymer powder Ref-3. This thus makes the problem-free use at elevated temperatures and pressures possible.

In addition to the applications shown in the Examples, the water-insoluble stabilising colloids, dispersions, and water-redispersible polymer powders according to the invention can also be used otherwise, such as for instance in repair mortars, ceramic tile adhesives, thermal insulation mortars, gypsum and/or lime and/or cement plasters, tile grouts and/or sealing compounds.

The invention claimed is:

1. A process for the preparation of an aqueous dispersion which is stabilized with a water-insoluble stabilizing colloid, the process comprising:
   preparing the water-insoluble stabilizing colloid by means of a radical polymerization in water of
   about 3 to 30 weight % of at least one olefinically unsaturated monomer containing at least one of a sulfate group and a sulfonate group, about 50 to 95 weight % of at least one olefinically unsaturated monomer having a water solubility at 20° C. of less than 50 g/l, and up to 20 weight % of at least one olefinically unsaturated monomer having a water solubility at 20° C. of more than 50 g/l, wherein the weight % is based on the total amount of monomer used for preparing the water-insoluble stabilizing colloid; and adding at least one further olefinically unsaturated monomer and at least one initiator, such that by means of a radical polymerization of the at least one further olefinically unsaturated monomer, the aqueous dispersion is obtained.

2. The process according to claim 1, wherein at least one of the at least one of a sulfate group and a sulfonate group is protonated.

3. The process according to claim 1, further comprising:
performing a residual monomer reduction by means of at least one of a polymerization of the residual monomers and a physical removal of the residual monomers.

4. The process according to claim 3, wherein the physical removal of the residual monomers further includes a physical removal of a volatile organic component by means of an introduction of at least one of vapor and gas.

5. The process according to claim 1, wherein the particle size of the water-insoluble stabilizing colloid, measured by means of light scattering and indicated as volumetric means, is about 50 to 2,000 nm.

6. The process according to claim 1, wherein the at least one olefinically unsaturated monomer containing at least one of a sulfate group and a sulfonate group is at least one of a (meth)acrylate monomer, a (meth)acrylamide monomer and a vinyl monomer.

7. The process according to claim 6, wherein the (meth)acrylate monomer is (meth)acrylic acid sulfoalkyl ester, the (meth)acrylamide monomer is 2-acrylamido-2-methylpropane sulfonic acid, and the vinyl monomer is at least one of styrene sulfonic acid, vinyl sulfonic acid, allyl sulfonic acid, and an alkaline, an alkaline earth and/or an ammonium salt thereof.

8. The process according to claim 1, wherein in preparing the water-insoluble stabilizing colloid, at least one of the olefinically unsaturated monomers is copolymerized with a further reactive group.

9. The process according to claim 8, wherein the further reactive group is selected from the group consisting of an epoxy, an epihalohydrin, an amine, an ammonium, a hydroxyl, an aldehyde, a ketone, an acid anhydride, an acetoacetonate, a carboxyl, a thiol, an alkoxysilane, a silanol, a glycidyl, a N-methylol, a sulfonic acid, an amide, an amidine, an imine, an ester, a carbonyl group, and combinations thereof.

10. The process according to claim 1, wherein the at least one further olefinically unsaturated monomer is converted to a homo- or copolymer in the presence of the water-insoluble stabilizing colloid by means of at least one of a radical emulsion, a suspension and a microemulsion polymerization in at least one of a continuous process, a monomer feed process, and a batch process, wherein in the monomer feed process, the monomers can also be dosed in the form of a pre-emulsion.

11. The process according to claim 10, wherein the at least one further olefinically unsaturated monomer is selected from the group consisting of vinyl ester, ethylene, (meth)acrylate, (meth)acrylamides, maleic acid and esters thereof, styrene, styrene derivatives, butadiene, and combinations thereof.

12. The process according to claim 1, wherein about 2 to 50 weight % of the water-insoluble stabilizing colloid is used, based on the solids content of the aqueous dispersion being obtained.

13. The process according to claim 1, wherein the particle size of the obtained aqueous dispersion, measured by means of light scattering and indicated as volumetric means, is about 0.1 to 5 μm.

14. The process according to claim 1, wherein the glass transition temperature Tg, measured as midpoint temperature in accordance with ASTM D3418-82, of the water-insoluble stabilizing colloid is between about 0 and 80° C., and the glass transition temperature Tg of the subsequently prepared homo- or copolymerizate is between about −50 and +80° C.

15. The process according to claim 1, wherein the solids content of the aqueous dispersion is about 30 to 75 weight %.

16. An aqueous dispersion obtained by the process according to claim 1.

17. A process for the preparation of water-redispersible polymer powders, the process comprising:
drying the aqueous dispersion obtained according to the process of claim 1 by means of spray drying, freeze drying, fluidized bed drying, drum drying or flash drying.

18. The process according to claim 17, wherein the aqueous dispersion is dried with at least one of a water-soluble polymer and a further additive.

19. The process according to claim 18, wherein the water-soluble polymer is at least one of partially hydrolyzed polyvinyl alcohol and partially hydrolyzed polyvinyl pyrrolidone, and the further additive is at least one of a polymer dispersion, a hydrophobic agent, a silane, a siloxanes, an air entraining agent, a wetting agent, a defoamer, a film forming adjuvant, a setting and solidification accelerator, a setting retarder, a thickening agent, a dispersing agent, a cement superplasticiser, a polycarboxylate, a polycarboxylate ether, a polyacrylamide, a water retention agent, a cellulose fiber, a cellulose ether, a starch ether, a guar ether, an additive for the reduction of at least one of efflorescence, sedimentation and bleeding, a filler, and an additive for the reduction of powder blocking.

20. A water-redispersible polymer powder obtained by the process of claim 17.

* * * * *